Dec. 5, 1939.                C. T. WALTER                2,182,188
                        LAMINATED SAUSAGE CASING
                          Filed Nov. 30, 1938
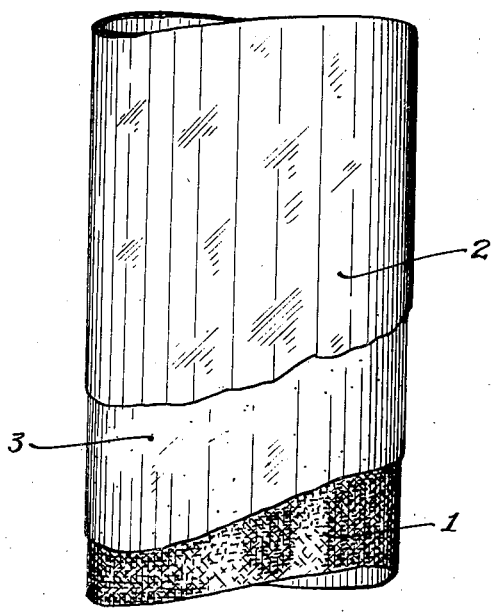
Charles T. Walter
INVENTOR Patented Dec. 5, 1939

2,182,188

UNITED STATES PATENT OFFICE 2,182,188

LAMINATED SAUSAGE CASING

Charles T. Walter, Chicago, Ill., assignor to Industrial Patents Corporation, Chicago, Ill., a corporation of Delaware Application November 30, 1938, Serial No. 243,293

4 Claims. (Cl. 99—176)

This invention relates to artificial sausage casings.

One of the objects of this invention is to provide an artificial sausage casing which is inexpensive to manufacture and which provides a satisfactory substitute for natural animal casings.

Cloth or fabric tubes and sacks have been employed in the manufacture of sausage in place of the usual natural animal casing. In recent years artificial sausage casings have been manufactured of transparent cellulosic tubing. Such artificial casings are satisfactory for use with certain types of sausage products.

The objections to the use of fabric or cloth in the manufacture of artificial casings are due to inherent properties of such material. If the fabric is of sufficient weight and closeness of weave to provide an effective casing, it will not slice with the meat. If the fabric is light in weight and loosely woven, meat tends to ooze through the interstices of the fabric during the stuffing operation. Fabric casings have been limited to heavy fabrics, which must be removed before the sausage meat is sliced.

The present invention contemplates the manufacture of a synthetic or artificial sausage casing from laminated sheet material having a fabric layer and a cellulosic layer. The fabric may consist of a loosely woven cloth, for example, an inexpensive cotton fabric.

A thin sheet of cellulosic material, for example, a thin sheet of transparent regenerated viscose cellulose, is laminated with the fabric layer by means of a suitable adhesive. I have found that cellulose viscose solution may be used satisfactorily as an adhesive.

In manufacturing an artificial casing according to my invention the fabric is coated on one side with a cellulose viscose solution. A thin sheet of cellulosic material is then placed on the coated surface of the fabric. The viscose solution is then regenerated in a suitable bath such as an acid solution of sodium sulphate to bond the adhesive layer to the fabric layer and to the cellulosic material layer. The laminated sheet is then dried and cut to the desired size. The cut laminated sheet is then sewed into the form of a tube. Any other suitable means for forming a tube from the laminated sheet material may be employed in forming the artificial casing.

In the drawing I have illustrated a portion of an artificial casing made in accordance with my invention. The casing consists of a fabric layer 1 and a layer of cellulosic sheet material 2 bonded to the fabric base by means of a suitable adhesive 3.

I have prepared satisfactory casings from inexpensive loosely woven cotton fabric and commercially available transparent regenerated viscose cellulose having a thickness of 0.00088 to 0.0012 inch. The fabric was coated with cellulose viscose solution and the film of cellulose pressed to the coated surface of the fabric. The cellulose was regenerated from the viscose solution by treatment with an acid solution of sodium sulphate whereby the adhesive was bonded to the fabric and the cellulose sheet.

The sausage casing is strong and durable. The inner fabric surface of the casing adheres well to the sausage meat and may be readily peeled from the sausage meat in the fashion of a natural animal casing. The laminated cellulose sheet adheres firmly to the fabric base and prevents any sausage meat from oozing through the interstices of the fabric base during the stuffing operation. The external layer of cellulosic sheet provides a smooth and impervious surface to the casing.

Casings manufactured according to my invention have desirable properties of both natural casings and artificial cellulose casings. The casing may be wetted by water and will stretch somewhat but will adhere firmly to the sausage meat, permits proper curing of the sausage meat, and is exceedingly strong and durable mechanically.

I claim:

1. A sausage casing comprising a layer of fabric, a layer of cellulosic material, and an intermediate layer of regenerated viscose cellulose bonded to the fabric and to the cellulosic material.

2. A sausage casing comprising a layer of fabric, a layer of transparent regenerated viscose cellulose, and an intermediate layer of regenerated viscose cellulose bonded to the fabric layer and to the transparent cellulose layer.

3. A sausage casing comprising a layer of loosely woven cloth, a layer of transparent regenerated viscose cellulose, and an intermediate layer of regenerated viscose cellulose bonded to the fabric layer and to the transparent cellulose layer.

4. A sausage casing comprising a layer of fabric, a layer of regenerated viscose cellulose 0.00088 inch in thickness, and an intermediate layer of regenerated viscose cellulose bonded to the fabric layer and to the first named cellulose layer.

CHARLES T. WALTER.